US008819066B2

(12) United States Patent
Banatwala et al.

(10) Patent No.: US 8,819,066 B2
(45) Date of Patent: Aug. 26, 2014

(54) EMPLOYING ORGANIZATIONAL CONTEXT WITHIN A COLLABORATIVE TAGGING SYSTEM

(75) Inventors: Mustansir Banatwala, Hudson, NH (US); Mary Ellen Zurko, Groton, MA (US)

(73) Assignee: International Business Machines Corporation, Armonk, NY (US)

( * ) Notice: Subject to any disclaimer, the term of this patent is extended or adjusted under 35 U.S.C. 154(b) by 1789 days.

(21) Appl. No.: 11/962,650

(22) Filed: Dec. 21, 2007

(65) Prior Publication Data

US 2009/0164267 A1 Jun. 25, 2009

(51) Int. Cl.
*G06F 17/30* (2006.01)

(52) U.S. Cl.
USPC .......................................................... 707/781

(58) Field of Classification Search
None
See application file for complete search history.

(56) References Cited

U.S. PATENT DOCUMENTS

| 2005/0289469 | A1* | 12/2005 | Chandler et al. ............... 715/745 |
| 2007/0032244 | A1* | 2/2007 | Counts et al. ............... 455/456.1 |
| 2008/0016098 | A1* | 1/2008 | Frieden et al. ................. 707/102 |
| 2008/0172363 | A1* | 7/2008 | Wang et al. ........................ 707/3 |
| 2008/0275851 | A1* | 11/2008 | Taylor et al. ........................ 707/3 |
| 2008/0281769 | A1* | 11/2008 | Hibbets ............................ 706/50 |
| 2009/0006285 | A1* | 1/2009 | Meek et al. ....................... 706/12 |

OTHER PUBLICATIONS

Cite U Like, <http://www.citeulike.org/> (Last visited Nov. 23, 2007).
Wikipedia, <http://en.wikipedia.org/wiki/Collaborative_tagging> (Last visited Nov. 16, 2007).
Wikipedia, <http://en.wikipedia.org/wiki/Social_bookmarking> (Last visited Nov. 16, 2007).

* cited by examiner

*Primary Examiner* — Mahesh Dwivedi
(74) *Attorney, Agent, or Firm* — Cuenot, Forsythe & Kim, LLC

(57) ABSTRACT

A computer-implemented method of employing organizational context within a collaborative tagging system can include receiving at least one tag for an artifact from a user, determining at least one attribute of the user, and storing a tag record including the tag, the attribute of the user, and an association of the tag with the artifact.

9 Claims, 2 Drawing Sheets

300

```
Business Report        Social Networks
May 2007               ⇨ Joe Smith

Interface Technology
                       ⇨ Jane Doe, John Smith, Joe Smith
```

```
Business Report        Interface Technology
May 2007               ⇨ Jane Doe, John Smith, Joe Smith
```

| Tag | Group | Members No. |
|---|---|---|
| Tag_A | Development | 10 |
| Tag_B | Legal | 5 |
| Tag_C | Engineering | 3 |

FIG. 5

EMPLOYING ORGANIZATIONAL CONTEXT WITHIN A COLLABORATIVE TAGGING SYSTEM

FIELD OF THE INVENTION

The embodiments of the present invention relate to computer systems and, more particularly, to collaborative tagging systems.

BACKGROUND OF THE INVENTION

A social network generally refers to a group of individuals related to one another based upon some shared value, idea, need, financial exchange, family relation, organization membership, etc. Social networks have existed in various forms in everyday life. With the continued development of the Internet, social networks have migrated into the online world. Examples of social networks include Internet-based and intranet-based bulletin boards or discussion forums. Such sites allow the posting of comments and/or files relating to a subject of common interest to the member users, e.g., the members of the "social network," community, or organization.

Online social networks allow users to post personal profiles with personal data, shared interests, pictures, music, video, and a variety of other user relevant information. To help organize, categorize, and navigate these large expanses of data, some systems have come to use collaborative tagging. In general, "collaborative tagging" refers to a system in which users associate keywords, known as "tags," with various objects or references to objects, e.g., data. Each tag can be user-defined and is usually descriptive of some aspect of the object(s) to which the tag is associated. A tag can be viewed as a form of metadata in that each tag provides information about the data to which the tag is associated.

Unlike typical taxonomies used for large digital libraries, the tags used to describe content in a collaborative tagging system are not defined by a rigid classification system. Rather, users may freely create tags and freely associate those tags with objects or references to objects, depending upon the particular type of collaborative tagging system. This results in a "flatter" structure for classifying data. By comparison, a taxonomy is hierarchical in nature. Navigating from one item of information to another within a taxonomy requires traversal of the hierarchy.

BRIEF SUMMARY OF THE INVENTION

The embodiments disclosed herein relate to collaborative tagging systems. One embodiment of the present invention can include a computer-implemented method of employing organizational context within a collaborative tagging system. The method can include receiving at least one tag for an artifact from a user, determining at least one attribute of the user, and storing a tag record including the tag, the attribute of the user, and an association of the tag with the artifact.

Another embodiment of the present invention can include a computer-implemented method of employing organizational context within a collaborative tagging system. The method can include receiving a query for a tag within the collaborative tagging system, wherein the query specifies at least one attribute of the tag and a selected artifact, and determining tag records that match the query. The method further can include outputting at least a portion of each tag record that matches the query.

Yet another embodiment of the present invention can include a computer program product including a computer-usable medium having computer-usable program code that, when executed, causes a machine to perform the various steps and/or functions described herein.

BRIEF DESCRIPTION OF THE SEVERAL VIEWS OF THE DRAWINGS

FIG. 3 is a first pictorial illustration of a user interface for use with a tagging system in accordance with another embodiment of the present invention.

FIG. 4 is second pictorial illustration of a user interface for use with a tagging system in accordance with another embodiment of the present invention.

FIG. 5 is a third pictorial illustration of a user interface for use with a tagging system in accordance with another embodiment of the present invention.

DETAILED DESCRIPTION OF THE INVENTION

Figure 1:
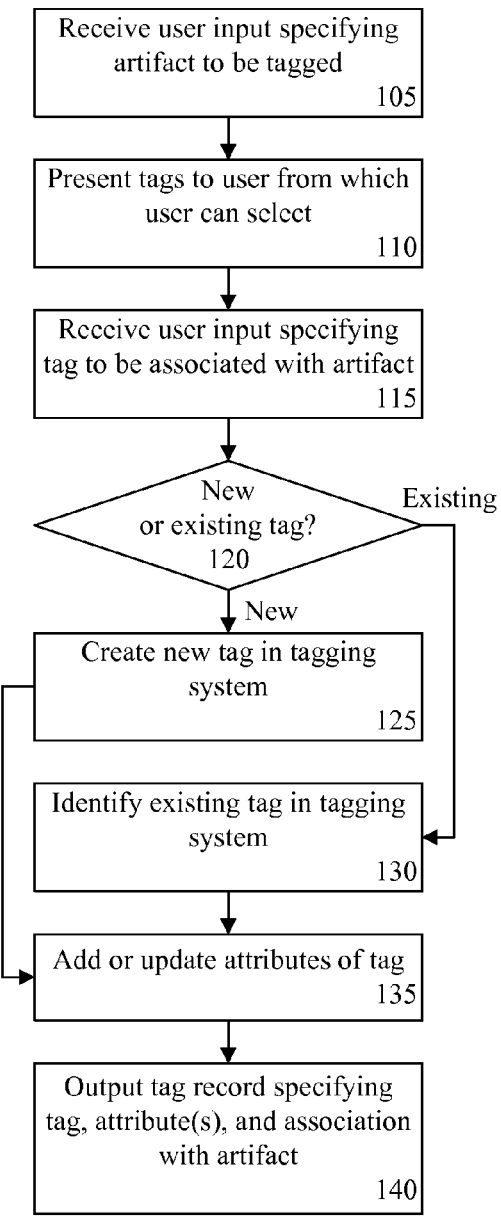
FIG. 1 is a flow chart illustrating a method of tagging artifacts in accordance with one embodiment of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, a magneto-optical disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The embodiments disclosed herein relate to employing organizational context within a collaborative tagging system. Within a collaborative tagging system, referred to herein as a "tagging system," users can freely create and associate tags with artifacts. An "artifact," as used herein, can refer to any form of digital information, for example, an electronic document, an object, a file, a portion of a file, text, video, audio, a picture, a universal resource identifier (URI) or universal resource locator (URL) (hereafter "bookmark"), and the like.

One variety of tagging system can store and/or maintain objects directly. For example, actual digital files can be stored or maintained within the system. Within such a tagging system, tag records may be associated or applied directly to the objects. Another variety of tagging system does not store or maintain objects, but rather stores references to, e.g., bookmarks, the objects. Within such a tagging system, tag records can be associated or applied to the reference rather than to the object itself. It should be appreciated that the embodiments disclosed herein can be applied and used with both varieties of systems. In this regard, a "tag for an artifact" may refer to the case where a tag may be directly associated with the artifact or to the case where the tag may be associated with a bookmark.

In general, as tags are associated with artifacts within a given organization, additional information, e.g., attributes, can be stored as part of the tag. Such attributes can include, for example, an identifier of the creator of the tag, organizational information relating to the creator of the tag, which can include the contextual information relating to the creation or use of the tag. These attributes can be utilized in any of a variety of transactions concerning the tagging system. For example, the attributes of a tag can be used when searching for tags and/or associated artifacts, determining which tags are to be made available to a particular user, or determining which users should be granted access to particular tags and/or the artifacts associated with those tags.

FIG. 1 is a flow chart illustrating a method 100 of tagging artifacts in accordance with one embodiment of the present invention. The method 100 illustrates one example of how tag attributes can be utilized within a tagging system. The method 100 can be implemented within one or more data processing system that, taken collectively, implement, or facilitate operation of, a tagging system.

In step 105, a user input can be received that specifies an artifact that is to be tagged. For example, the user input can specify a bookmark that references a particular electronic document such as a markup language page. The markup language page can detail a business proposal that is to be submitted for review to a review board within an organization, e.g., a business.

In step 110, the user optionally can be presented with one or more tags of the tagging system. The user can select one or more tags from the set of presented tags for association with the artifact selected in step 105. In one embodiment, the particular tags that are presented to the user may be filtered, e.g., may be a subset of tags of the tagging system. Such a subset can be determined in any of a variety of different ways.

In one embodiment, the particular tags presented to the user may be filtered or selected from the tagging system according to attributes of the user. For example, one or more user attributes for the user can be determined. Such attributes can include, but are not limited to, the identity of the user, organizational information relating to the user, or the like. Organizational information can include, for example, an organizational role of the user, membership within a particular group of an organization, a job description, particular access rights or privileges, a position within an organization, a role with respect to an artifact, an authority within the organization, an authority with respect to the artifact, or some other suitable role or authority within an organization, etc. As can be seen, various attributes convey contextual information o the circumstances under which the tag is being used, created, or applied by the user.

One or more of such attributes can be used to limit the particular tags presented and from which the user may choose to associate with the artifact identified in step 105. Such information may useful to later search tag records for tags created or assigned by selected users, users having particular roles, or users that utilized a tag within a particular context. Attributes of tags conveying such information can indicate that the associated tag carries more value than other tags due to the authority or role of the users that created and/or used the tag. For example, the attributes may indicate that some users have increased responsibility with respect to the artifact or have a self-interest in a particular artifact. Such information may be of interest to others in evaluating which tags are more useful than others and in dismissing the utility of other tags.

For example, if the user is a manager, a review board member, a member of management with oversight authority over the review process, an in-house attorney, or some other suitable member of an organization, such attributes can be determined. It should be appreciated that the attributes of a user can either be provided directly from the user or accessed from a user profile of the user or an organizational chart that is maintained within the organization within which the user is a member, e.g., the business with which the user is employed.

Thus, if the user is a member of the review board, the user may be presented with a collection of tags that have been created by and/or used by members of the review board. In one embodiment, the filtering of tags that are presented can be performed automatically using one or more predetermined or default attributes of the user as compared to attributes of tags within the tagging system. In any case, the tags from which the user may choose can be filtered, or limited to, those tags associated with one or more of the above mentioned groups, e.g., attributes. It should be appreciated as items of contextual information within an organization may overlap, tag filtering may be performed to include tags having a particular attribute, but exclude any tags having that attribute that also have another specified attribute. For example, one may view tags of a development group but exclude tags having an attribute of the development group that also have an attribute corresponding to "creator" of the business proposal or document being evaluated. The user may also choose to create a new tag in the event that no tag that is available is applicable or descriptive of the business proposal.

Continuing with the prior example, the user may be presented with a listing of tags that have been applied to business proposals within a particular commercial sector, a listing of the tags that have been applied to business proposals that a particular review board oversees, or some other suitable subset of tags. Selecting a tag from a particular subset of tags of the tagging system can result in a more consistent use of language within a group of members of an organization, which may improve the value of the tagging system to members of the group and others within the larger organization. Of course, the user may create a new tag particularly if the tags found within the tag cloud for the group do not adequately express the user's thoughts or ideas.

In another embodiment, the user may select the particular criteria that will be used in selecting which tags are to be presented. For example, the user may wish to view only the tags of the tagging system that have been used or created by attorneys (a particular position in an organization), members of a particular design project or team (a particular group), a particular individual (a particular user), a review board member (a particular role). It should be appreciated that a "position" of an organization can refer to a job title or a location within an organizational hierarchy. By comparison, a "role" can refer to a set of duties or tasks a user may be responsible for performing, or a relationship to a particular object. An example of "role" can include being on a review board. That role can be independent of the job title of the user, e.g., members of a review board may include engineers, attorneys, a group manager, or the like. Further, a role may be a temporary state.

In yet another embodiment, the tags that are presented can be those that the user is permitted to access according to an access control list. For example, each tag may take on the security level of the user that created that tag. Accordingly, a user would only be able to view those tags having a security level at or below that of the user. Still, it should be appreciated that any combination of the various attributes noted herein can be used to filter or otherwise determine which tags may be presented to the user for purposes of selection. The application of a filter may be automatic or manually specified by the user performing the tagging operation.

In another example, a tag, when associated with an artifact, can take on the protections, e.g., security settings, of the artifact. In that case, the tag, as well as the artifact, would only be available or viewable, as the case may be, to users having proper security credentials. Access to the tag, or any artifact associated with the tag, by any users without proper security credentials can be prevented. For example, the security credentials of a user can be compared with the security settings of the tag. Only when the security credentials of the user conform with, or meet, the security settings of the tag would the user be provided access to the tag or any artifacts associated with the tag.

In step 115, a user input can be received that specifies a tag to be associated with the artifact. As can be appreciated, the tag received from the user may be descriptive of the artifact. For example, if the artifact is a business proposal, the tag can be descriptive of a technology that is important to the business proposal, descriptive of the importance of the business proposal, descriptive of the potential value of the business proposal to the organization, or even a label such as "business proposal."

In step 120, a determination can be made as to whether the specified tag is a new tag or a tag that exists within the tagging system. It should be appreciated that more than one tag may be received by the tagging system from the user at one time. For purposes of illustration and discussion, it will be assumed that the user input specifies a single tag. In any case, if the tag is a new tag, the method can proceed to step 125. If the tag is an existing tag within the tagging system, the method can continue to step 130.

In step 125, the new tag can be created within the tagging system. In step 135, any attributes of the user may be applied to, or stored with, the tag. For example, the identity of the user, a digital signature, organizational information about the user, and/or access control information may be stored as part of, or with, the tag. In one embodiment, the user identity can be stored with the tag. The tagging system can be programmed so that the tag inherits attributes of that user, e.g., as determined from a user profile or an organizational chart. In that case, the attributes need not be stored directly with or as part of the tag. In another embodiment, however, any attributes to be associated or given to a tag may be stored with or as part of the tag.

The association of a digital signature to a tag as an attribute facilitates decentralization and trustworthiness. For example, a digital signature of a user can be applied to a tag when the user creates the tag, associates the tag with an artifact, or associates the tag with the user's identity. The digital signature provides proof and certainty in that the user is "vouching" for the tag. In another example, a digital signature can be provided by a separate system that manages groups. For example, the digital signature can be provided by the trustworthy repository of an organizational chart that specifies various user attributes that can be associated with a tag. In that case, the digital signature can provide proof and certainty that a given user is legitimately in a group, role, position, etc., in which she or he proclaims herself or himself to be a part.

Continuing with step 130, in the case where the user specified an existing tag, that tag may be identified within the tagging system. In step 135, the tag may be updated to include one or more attributes relating to the user as discussed.

In step 140, a tag record can be output. The tag record can specify the tag, any attributes of the tag, and/or an association of the tag with the artifact selected in step 105. As used herein, "output" or "outputting," can include, for example, storing in memory, writing to a file, writing to a user display or other output device, playing audible notifications, sending or transmitting to another system, exporting, or the like. It should be appreciated that in terms of querying or filtering tags, tags, associated tag attributes, and associations of tags with artifacts may be searched independently, in any combination, or all concurrently, e.g., as a tag record.

Figure 2:
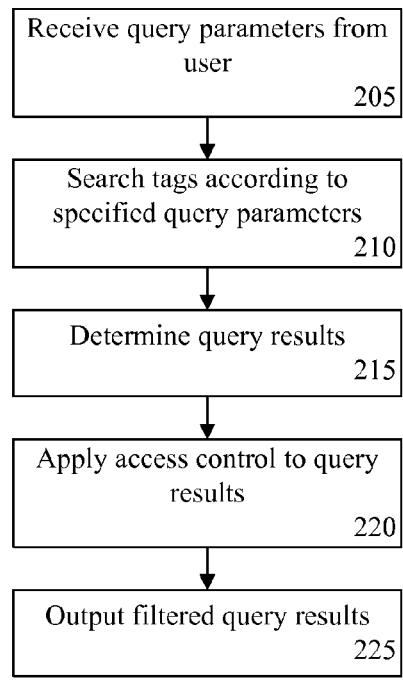
FIG. 2 is a flow chart illustrating a method of querying within a tagging system in accordance with another embodiment of the present invention.

FIG. 2 is a flow chart illustrating a method 200 of querying within a tagging system in accordance with another embodiment of the present invention. The method 200 can begin in step 205 where a query specifying one or more query parameters is received from a user. The query parameters can specify a particular tag that is sought after and/or attributes that are to be associated with any returned tags or corresponding artifacts. The query parameters further can include one or more parameters relating to an artifact to be located, e.g., a portion of a file name, a date of creation, or the like. Thus, when an artifact is specified via one or more query parameters, only artifacts that match the query parameters, e.g., both artifact parameters and tag-related parameters. can be returned as a query result.

For example, a user can search for a tag called "business proposal," "Java," or any combination of tags. Further parameters can be specified for the query such as an organizational role, e.g., attorney, review board, or the like. Alternatively, the query can specify parameters relating to tag attributes without specifying a particular tag or tags, in an effort to retrieve each tag, and potentially associated artifact, having an attribute that matches the specified query parameters.

In step 210, the tags and/or tagging records of the tagging system can be searched according to the specified query parameters. If an artifact is specified via one or more parameters, the artifacts also may be searched. In step 215, a query result can be determined. The query result can include tags that match the query parameters and/or artifacts that match any artifact parameters of the query. Any artifacts associated with such tags may also be determined.

In step 220, access control privileges optionally can be applied to the query results. For example, any tags, or tag records, determined in step 215 that have a security level exceeding the security level of the user that initiated the query can be filtered out or removed from the query results.

In one embodiment, for example, if the artifact is a business strategy document, the artifact may reference a list of organizational members with some role or authority with respect to that artifact. Such organizational members may be given access to the tag and/or record while others may be precluded from accessing the tag, tag record, and/or associated artifact. In another embodiment, access control can be determined from the organizational information. For example, if a user who creates a tag record is a member of a particular department, other members of the department may be granted access to the tag record. Access further may be determined according to organizational role, position within an organizational hierarchy, etc. In step 225, the filtered query results can be output. It should be appreciated that any artifacts that are tagged with a tag within the query results also may be presented to the user.

FIG. 3 is a first pictorial illustration of a user interface 300 for use with a tagging system in accordance with another embodiment of the present invention. The user interface 300 can be used to present tags as well as various attributes of tags. In one embodiment, the user interface can be used to present query results, though the application of the user interface 300 in that context is not intended to be limiting of the embodiments disclosed herein.

In this case, a user has initiated a query specifying a particular artifact, such as a business report for May of 2007. Responsive to the query, the tagging system presents the query results showing the various tags that are associated with the artifact. As shown, the business report is associated with a tags "social networks" and "interface technology." The "social networks" tag was associated with the artifact by user "Joe Smith." The "interface technology" tag was associated with the artifact by users "Jane Doe," "John Smith," and "Joe Smith."

From a review of the initial search results, it appears that the business report is related to both interface technology and social networks. A further refinement of the query, however, where only tags from a particular group such as a "business review board" are displayed can reveal different information.

FIG. 4 is second pictorial illustration of a user interface 400 for use with a tagging system in accordance with another embodiment of the present invention. FIG. 4 illustrates the case where the initial user query discussed with reference to FIG. 3 has been refined to show only tags for the artifact that relate to, or have been associated with the artifact by, members of the business review board. With this query refinement, it can be seen that the artifact relates to interface technology, not social networks.

This information and ability to filter tag information can be used for determining priorities and allocating other resources. For example, if "social networks" is a high priority area, the business report may be given more attention. Without the ability to query or filter tags according to various attributes, such as group, which reflect a user's role or task, e.g., relationship, to a particular artifact, such information would not be available.

FIG. 5 is a third pictorial illustration of a user interface 500 for use with a tagging system in accordance with another embodiment of the present invention. User interface 500 illustrates an embodiment of the present invention where additional tag-related information may be presented. In this case, a list of tags including "Tag A," "Tag_B," and "Tag_C" is displayed. A group attribute is displayed for each tag in addition to the number of members of that group that have used the tag. For example, the user interface 500 can be presented responsive to a query for a particular tag attribute or an artifact, or a combination of both. In any case, the presented information indicates the groups that have used a particular tag as well as a count of the number of members that have used the tag.

It should be appreciated by those skilled in the art that the user interfaces presented herein have been shown for purposes of illustration only. Other mechanisms for visually indicating different attributes of tags may be used. For example, tags from the "development" group may be shown or highlighted in one color, while tags from another group such as "legal" may be shown in another color. For example, the user's query can specify a plurality of group attribute values as search parameters. The query results can be color coded showing which tags in the list of results were located and presented as a result of each search parameter, in this case tag attribute.

The flowchart(s) and block diagram(s) in the figures illustrate the architecture, functionality, and operation of possible implementations of systems, methods and computer program products according to various embodiments of the present invention. In this regard, each block in the flowchart(s) or block diagram(s) may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of employing organizational context within a collaborative tagging system, the method comprising:
    receiving at least one tag for an artifact from a user;
    determining at least one attribute of the user, wherein the at least one attribute comprises a security level associated with the user;
    storing a tag record comprising the tag, the attribute of the user, and an association of the tag with the artifact;
    determining a subset of tags of the tagging system according to the security level of the user; and
    presenting the subset of tags to the user, wherein the tag for the artifact is selected from the subset of tags.

2. The computer-implemented method of claim 1, wherein determining at least one attribute comprises determining an identity of the user.

3. The computer-implemented method of claim 2, further comprising:
    determining a subset of tags of the tagging system according to the identity of the user; and
    presenting the subset of tags to the user, wherein the tag for the artifact is selected from the subset of tags.

4. The computer-implemented method of claim 1, wherein determining at least one attribute further comprises determining organizational information of the user.

5. The computer-implemented method of claim 4, further comprising:
    determining a subset of tags of the tagging system according to the organizational information of the user; and
    presenting the subset of tags to the user, wherein the tag for the artifact is selected from the subset of tags.

6. A computer program product comprising a non-transitory computer-readable storage device comprising computer-usable program code stored thereon that employs organizational context within a collaborative tagging system, the computer-readable storage comprising:
    computer-usable program code that receives at least one tag for an artifact from a user;
    computer-usable program code that determines at least one attribute of the user, wherein the at least one attribute comprises a security level associated with the user;
    computer-usable program code that stores a tag record comprising the tag, the attribute of the user, and an association of the tag with the artifact;
    computer-usable program code that determines a subset of tags of the tagging system according to the security level of the user; and
    computer-usable program code that presents the subset of tags to the user, wherein the tag for the artifact is selected from the subset of tags.

7. The computer program product of claim 6, wherein the computer-usable program code that determines at least one attribute comprises computer-usable program code that determines an identity of the user.

8. The computer program product of claim 6, wherein the computer-usable program code that determines at least one attribute comprises computer-usable program code that determines organizational information of the user.

9. The computer program product of claim 8, wherein the computer-usable medium further comprises:
    computer-usable program code that determines a subset of tags of the tagging system according to the organizational information of the user; and
    computer-usable program code that presents the subset of tags to the user, wherein the tag for the artifact is selected from the subset of tags.

* * * * *